(12) United States Patent
Xie et al.

(10) Patent No.: US 9,806,602 B2
(45) Date of Patent: Oct. 31, 2017

(54) RADIO FREQUENCY INTERFERENCE SUPPRESSION CIRCUIT

(71) Applicant: DELTA ELECTRONICS, INC., Taoyuan (TW)

(72) Inventors: Yi-Cong Xie, Taoyuan (TW); Min Zhou, Taoyuan (TW); Rui Wu, Taoyuan (TW); Jin-Ping Zhou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/272,420

(22) Filed: Sep. 21, 2016

(65) Prior Publication Data

US 2017/0093275 A1 Mar. 30, 2017

(30) Foreign Application Priority Data

Sep. 25, 2015 (CN) .......................... 2015 1 0622396

(51) Int. Cl.
| | |
|---|---|
| *H02M 1/44* | (2007.01) |
| *H02M 1/42* | (2007.01) |
| *H02M 3/335* | (2006.01) |
| *H02M 3/156* | (2006.01) |
| *H02M 3/158* | (2006.01) |
| *H02M 3/337* | (2006.01) |
| *H02M 7/487* | (2007.01) |

(52) U.S. Cl.
CPC .............. *H02M 1/44* (2013.01); *H02M 1/42* (2013.01); *H02M 3/33507* (2013.01); *H02M 1/4225* (2013.01); *H02M 3/156* (2013.01); *H02M 3/1584* (2013.01); *H02M 3/337* (2013.01); *H02M 7/487* (2013.01); *Y02B 70/126* (2013.01)

(58) Field of Classification Search
CPC ... H02M 2001/123; H02M 2007/4815; H02M 2007/4818; H02M 1/12; H02M 1/14; H02M 1/42; H02M 1/44
USPC .................. 363/21.02, 39, 40, 44, 46, 50, 55
See application file for complete search history.

(56) References Cited

U.S. PATENT DOCUMENTS

| | | | |
|---|---|---|---|
| 6,819,744 B1 * | 11/2004 | Banwell ................ | H04M 3/002 324/533 |
| 8,222,965 B1 * | 7/2012 | Juneau ................. | H03C 3/0916 331/1 A |
| 2006/0164868 A1 * | 7/2006 | Weber ..................... | H02M 1/32 363/16 |

(Continued)

*Primary Examiner* — Adolf Berhane
(74) *Attorney, Agent, or Firm* — CKC & Partners Co., Ltd.

(57) ABSTRACT

A radio frequency interference suppression circuit that includes a reference ground end, a main power circuit, a driving circuit and an impedance unit is provided. The main power circuit includes a first switch that includes a control end, a first and a second end. A minimal impedance is presented between the second end and the reference ground end. The driving circuit is coupled to the control end and the second end. The first impedance unit is formed between the second end and the reference ground end in a high frequency differential mode loop to reduce a high frequency voltage drop therein. The first switch receives a driving signal from the driving circuit to be turned on or turned off between the first and the second ends accordingly to make the main power circuit converts a first power signal to a second power signal.

18 Claims, 24 Drawing Sheets

(56) References Cited

U.S. PATENT DOCUMENTS

| | | | |
|---|---|---|---|
| 2008/0143285 A1* | 6/2008 | Lucas | H02M 1/44 318/400.24 |
| 2015/0180351 A1* | 6/2015 | Li | H02M 3/00 363/21.12 |
| 2016/0164448 A1* | 6/2016 | Kane | H02P 27/06 318/400.24 |
| 2017/0054294 A1* | 2/2017 | Lyu | H02J 3/01 |
| 2017/0149240 A1* | 5/2017 | Wu | H02J 1/00 |

* cited by examiner

RADIO FREQUENCY INTERFERENCE SUPPRESSION CIRCUIT

RELATED APPLICATIONS

This application claims priority to China Application Serial Number 201510622396.8, filed Sep. 25, 2015, which is herein incorporated by reference.

BACKGROUND

Field of Invention

The present invention relates to a radio frequency interference suppression technology. More particularly, the present invention relates to a radio frequency interference suppression circuit.

Description of Related Art

Along with the development of the modern technologies, the number and the type of the electronic equipments increase. Not only the electric power is consumed greatly, but also the unnecessary electro-magnetic energy increases. The energy affects the normal operation of the other equipments or systems. Under such a complex electro-magnetic environment, how to suppress the electro-magnetic interference therebetween to make the equipments and systems operate normally is a critical problem to be solved. An era of high frequency, high power density and high efficiency of the power electronic devices is arrived due to the application in high frequency band of the new power field effect components. The power conversion process of these power electronic devices results in larger current or voltage pulses that cause serious electro-magnetic interference. Such interference forms the radio frequency interference (RFI) after a near field electric coupling or a far field electric coupling to greatly affect the electro-magnetic environment and the power system.

The transmission and the delivering of the RFI is formed by the following components: a differential mode interference source, a noise transmission and coupling path and an antenna. The differential mode interference source mainly refers to the inrush current or voltage generated during the turn-on and turn-off of the semiconductor elements within the electronic equipment. The inrush current or voltage signal is the original differential mode interference source. Combining with the transmission path, there are various current driving mechanisms described below.

Reference now is made to FIG. 17. FIG. 17 is a diagram of an equivalent delivering model of the differential mode loop. The current-type excitation mechanism is described below. At first, the interference signal is generated by the differential mode interference source V_dm. The common mode interference signal V_cm is further generated at the parasitic impedance L_return of the high frequency differential return path by transmitting the interference signal through the differential mode loop that includes impedances L_signal, L_return and R. Such a high frequency voltage signal acts as an excitation source between the input and output wires. A common mode current I_cm is formed by passing the high frequency voltage signal through the loops such as the parasitic capacitor C_ant between the input and output wires and the ground. Accordingly, the wires form an effective dipole antenna that the electronic equipments generate RFI therethrough.

$$\begin{cases} \text{I\_cm} \sim j\omega \cdot C\_ant \cdot V\_cm \\ V\_cm \sim j\omega \cdot L\_return \cdot I\_dm \\ I\_dm \approx V\_dm/R \end{cases} \quad \text{(Equation 1)}$$

$$\text{I\_cm} \sim -\omega^2 \cdot C_{ant} \cdot \text{L\_return} \cdot V\_dm/R \quad \text{(Equation 2)}$$

According to equation 1 and equation 2, the common mode current generated in the current-type excitation mechanism is directly proportional to the impedance of the inner differential mode current return path of the electronic equipments and is directly proportional to the square of the frequency and the amplitude of the differential mode interference source.

Accordingly, what is needed is a radio frequency interference suppression circuit to address the above issues.

SUMMARY

An aspect of the present invention is to provide a radio frequency interference suppression circuit that includes a reference ground end, a main power circuit, a driving circuit and an impedance unit. The main power circuit includes a first switch that includes a control end, a first end and a second end. A minimal impedance is presented between the second end and the reference ground end. The driving circuit is coupled to the control end and the second end. The impedance unit is formed between the second end and the reference ground end to increase an impedance value in a high frequency differential mode loop to reduce a high frequency voltage drop therein. The first switch receives a driving signal from the driving circuit at the control end to be turned on or turned off between the first and the second ends accordingly to make the main power circuit converts a first power signal to a second power signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
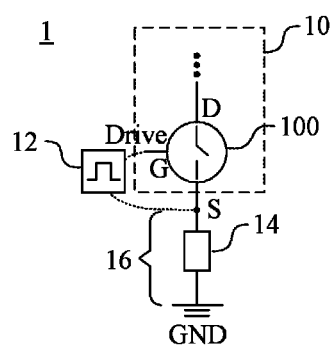
FIG. 1A is a circuit diagram of a radio frequency interference suppression circuit in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
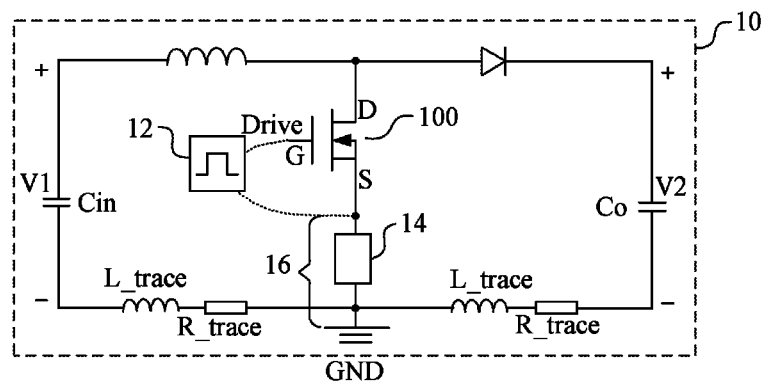
FIG. 1B is a detail diagram of the radio frequency interference suppression circuit in an embodiment of the present invention.

Reference is now made to FIG. 1A and FIG. 1B. FIG. 1A is a circuit diagram of a radio frequency interference suppression circuit 1 in an embodiment of the present invention. FIG. 1B is a detail diagram of the radio frequency interference suppression circuit 1 in an embodiment of the present invention. The radio frequency interference suppression circuit 1 includes a reference ground end GND, a main power circuit 10, a driving circuit 12 and an impedance unit 14.

The main power circuit 10 can be a non-isolated converter circuit or an isolated converter circuit. The main power circuit 10 exemplarily illustrated in FIG. 1B is a boost converter, which is a kind of non-isolated converter circuit. However, the main power circuit 10 of the present invention is not limited thereto. The main power circuit 10 includes a first switch. In FIG. 1A, only one first switch 100 is exemplarily illustrated. In other embodiments, the main power circuit 10 may include a multiple of first switches.

The first switch 100 includes a control end G, a first end D and a second end S. In an embodiment, the first switch 100 can be implemented by a semiconductor field-effect transistor (MOSFET) as illustrated in FIG. 1B. The control end G is the gate, the first end D is the drain and the second end S is the source. In other embodiments, the first switch 100 can be implemented by an insulated gate bipolar transistor (IGBT) or a bipolar junction transistor (BJT). Under such a condition, the control end G is the base, the first end D is the collector and the second end S is the emitter. The following description is given by using the MOSFET as an example.

Corresponding to the first switch 100, the driving circuit 12 is coupled to the control end G and the second end S of the first switch 100. In an embodiment, the driving circuit 12 is disposed according to the number of the first switch 100. In the embodiments, one driving circuit 12 can be electrically coupled to a multiple of first switches to drive the first switches, depending on different applications. In an embodiment, the driving circuit 12 generates a driving signal Drive.

When the driving signal Drive is at a high state, the first switch 100 is turned on and is conducted between the first end D and the second end S. When the driving signal Drive is at a low state, the first switch 100 is turned off and is disconnected between the first end D and the second end S. Based on the turn-on and the turn-off of the first switch 100 between the first end D and the second end S, the main power circuit 10 converts a first power signal V1 to a second power signal V2 as illustrated in FIG. 1B.

The impedance unit 14 is formed between the second end S of the first switch 100 and the reference ground end GND. As compared to the other switches in the main power circuit 10, minimal impedance is presented between the second end S and the reference ground end GND. In FIG. 1A and FIG. 1B, the switch 100 is the first switch of the main power circuit 10 that has a path that has the minimal impedance between the second end S and the reference ground end GND, such as the path 16 illustrated in FIG. 1A and FIG. 1B.

Figure 1C:
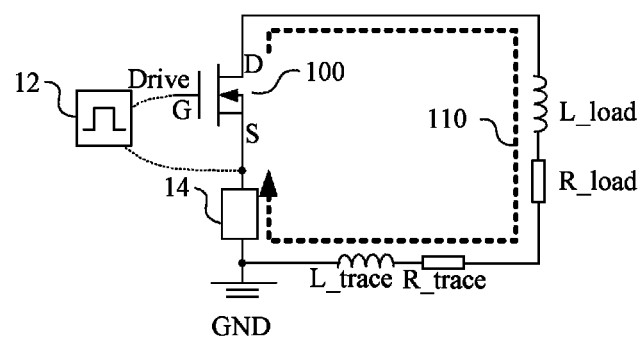
FIG. 1C is a diagram of the first switch, the driving circuit, the reference ground end and the high frequency differential mode loop in an embodiment of the present invention.

Reference is now made to FIG. 1C. FIG. 1C is a diagram of the first switch 100, the driving circuit 12, the reference ground end GND and the high frequency differential mode loop 110 in an embodiment of the present invention. The high frequency differential mode loop 110 is an equivalent loop of the main power circuit 10 under the high frequency operation.

The turn-on and turn-off of various switches in the main power circuit 10 cause instant changes of the current and voltage to form the differential mode interference source. After the interference signal passes through the parasitic impedance in the return path of the high frequency differential mode loop 110, a high frequency voltage drop is generated to become the common mode interference voltage and form the common mode interference current at the same time. The condition of the radio frequency interference is thus generated due to the high frequency voltage drop on the high frequency differential mode loop 110.

In an embodiment, the impedance unit 14 has an impedance value not lower than 0.6 Ohm during a radiation frequency band of 30 mega hertz (MHz) to 1000 MHz. Since the impedance unit 14 is disposed between the second end S of the first switch 100 and the reference ground end GND, which is not in the driving loop formed by the driving circuit 12 and the first switch 100, the driving speed is not affected, and the low loss characteristic of the components is maintained. However, the disposition of the impedance unit 14 increases the impedance value in the high frequency differential mode loop 110 and further decreases a high frequency voltage drop of the parasitic impedance of the high frequency differential return path. The condition of RFI is suppressed.

Figure 2:
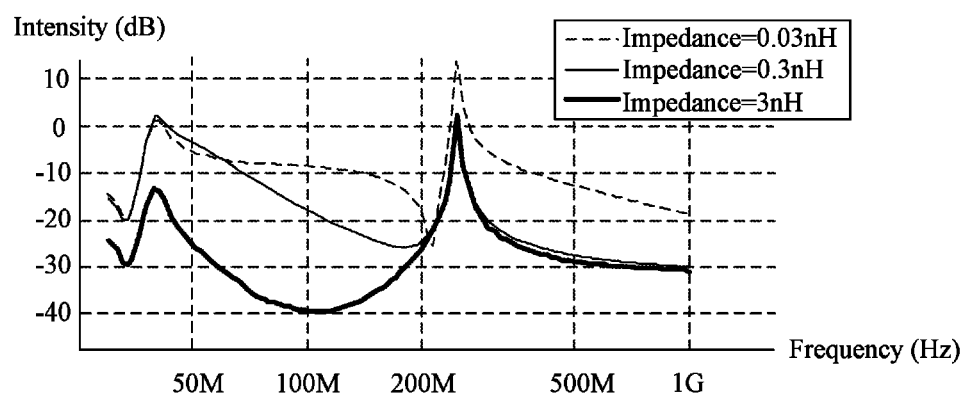
FIG. 2 is a diagram of a frequency response of the RFI in an embodiment of the present invention.

Reference is now made to FIG. 2. FIG. 2 is a diagram of a frequency response of the RFI in an embodiment of the present invention. The x-axis is the frequency of the RFI signal in the unit of Hertz. The y-axis is the intensity of the RFI signal in the unit of dB.

As illustrated in FIG. 2, the dashed line illustrates the condition of having no impedance unit such that only the parasitic impedance of 0.03 nH is presented in the path 16. The thinner line illustrates the condition of adding the impedance unit 14 to have the impedance value of 0.3 nH. The thicker line illustrates the condition of adding the impedance unit 14 to have the impedance value of 3 nH. Obviously, when the impedance value of the added impedance unit 14 is larger, the intensity of the RFI signal decreases more. Alternatively stated, the impedance unit 14 having the larger impedance value has a greater suppression effect on the RFI condition.

Reference is now made to FIG. 3A to FIG. 3E. FIG. 3A to FIG. 3E are detail circuit diagrams of the impedance unit 14 in different embodiments of the present invention.

Figure 3A:
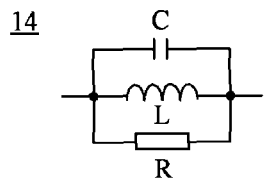
FIG. 3A to FIG. 3E are detail circuit diagrams of the impedance unit in different embodiments of the present invention.
Figure 3B:
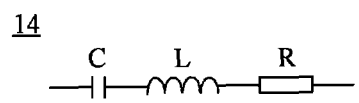
Figure 3C:
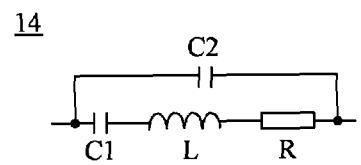
Figure 3D:
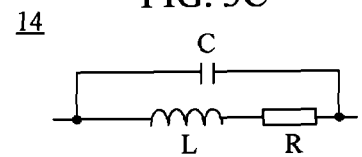
Figure 3E:
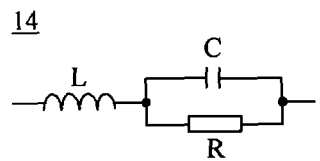

The impedance unit 14 can include a multiple of impedance components such as a resistive component R, an inductive component L, a capacitive component C or a combination of the above. The impedance components can form networks connected in parallel, in series or in both parallel and serial. For example, in FIG. 3A, the impedance unit 14 includes the resistive component R, the inductive component L and the capacitive component C connected in parallel. In FIG. 3B, the impedance unit 14 includes the resistive component R, the inductive component L and the capacitive component C connected in series. In FIG. 3C, the impedance unit 14 includes a network of the resistive component R, the inductive component L and the capacitive component C connected in series, wherein the network is further connected to a capacitive component C2 in parallel. In FIG. 3D, the impedance unit 14 includes a network of the resistive component R and the inductive component L connected in series, wherein the network is further connected to the capacitive component C in parallel. In FIG. 3E, the impedance unit 14 includes a network of the resistive component R and the capacitive component C connected in parallel, wherein the network is further connected to the inductive component L in series.

The number and the connection of the resistive component R, the inductive component L and the capacitive component C are exemplarily described. In other embodiments, the impedance unit 14 can include different numbers and the configurations of components. Other impedance components known by that those skilled in the art can be included as well.

Reference is now made to FIG. 4A to FIG. 4H. FIG. 4A to FIG. 4H are diagrams of the package structure of the first switch 100, the driving circuit 12 and the impedance unit 14 in different embodiments of the present invention.

Figures 4A, 4B:
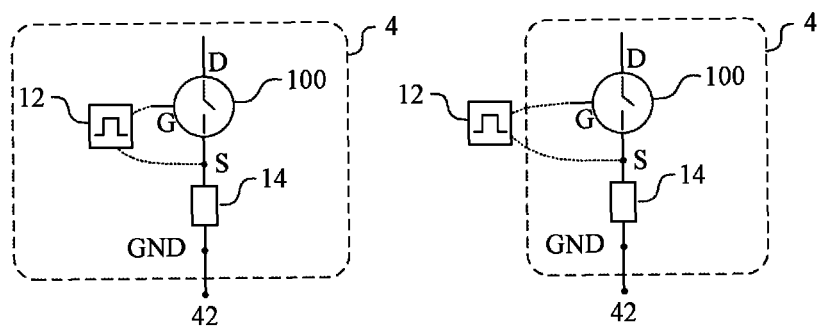
FIG. 4A to FIG. 4H are diagrams of the package structure of the first switch, the driving circuit and the impedance unit in different embodiments of the present invention.

In an embodiment, the first switch 100, the driving circuit 12 and the impedance unit 14 are disposed in a single package structure 4 as illustrated in FIG. 4A. In another embodiment, the first switch 100 and the impedance unit 14 are disposed in the package structure 4 while the driving circuit 12 is disposed outside of the package structure 4 as illustrated in FIG. 4B.

Figures 4C, 4D:
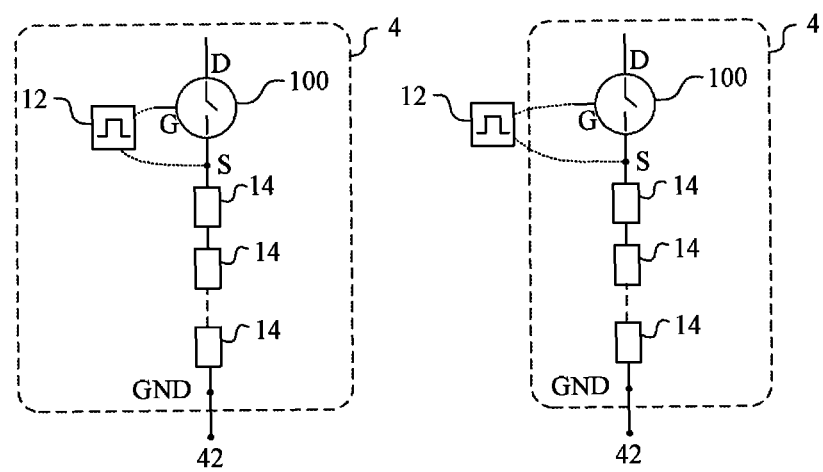

In an embodiment, the number of the impedance unit 14 can be more than one and can be connected in series. Further, the first switch 100, the driving circuit 12 and the impedance unit 14 are disposed in a single package structure 4 as illustrated in FIG. 4C. In another embodiment, the first switch 100 and the impedance units 14 having the number more than two are disposed in the package structure 4 while the driving circuit 12 is disposed outside of the package structure 4 as illustrated in FIG. 4D.

Figure 4E:
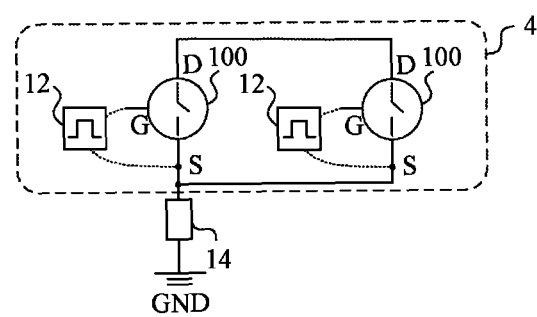
Figure 4F:
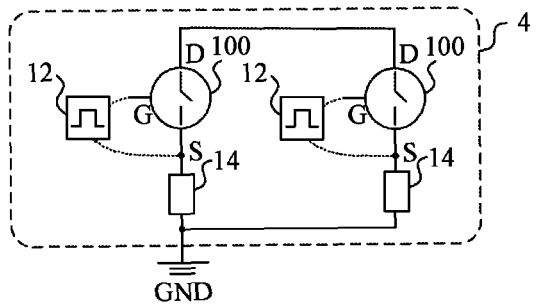

In an embodiment, in order to take the ability of high current endurance in to consideration, a multiple of first switches 100 connected in parallel can be disposed in a package structure and operate to be turned on or turned off simultaneously. As illustrated in FIG. 4E, two first switches 100 are connected in parallel and two corresponding driving circuits 12 are disposed. Further, the two first switches 100 can share one impedance unit 14. In the present embodiment, the two first switches 100 and the two driving circuits 12 are disposed in the package structure 4 while the impedance unit 14 is disposed outside of the package structure 4. In another embodiment, two impedance units 14 can be respectively disposed corresponding to the two first switches 100 and are both connected to the reference ground end GND as illustrated in FIG. 4F. In the present embodiment, the two first switches 100, the two driving circuits 12 and the impedance unit 14 are disposed in the package structure 4.

Figure 4G:
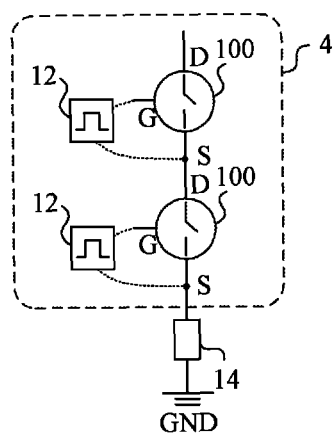
Figure 4H:
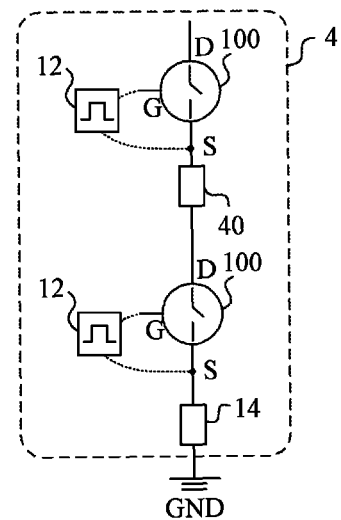

In an embodiment, in order to take the ability of high voltage endurance into consideration, a multiple of first switches 100 connected in series can be disposed in a package structure and operate to be turned on or turned off simultaneously. As illustrated in FIG. 4G, two first switches 100 are electrically coupled and two corresponding driving circuits 12 are disposed in the package structure 4. Further, the impedance unit 14 is disposed outside of the package structure 4. In another embodiment, an additional impedance unit 40 is electrically coupled between the two first switches 100 as illustrated in FIG. 4H. The two first switches 100, the two driving circuits 12 and the impedance unit 14 are disposed in the package structure 4.

It is appreciated that in an embodiment, the reference ground end GND can be electrically coupled to other external circuits through the reference ground pin 42 of the package structure 4, as illustrated in FIG. 4A to FIG. 4D.

Reference is now made to FIG. 5A to FIG. 5D. FIG. 5A to FIG. 5D are diagrams of the package structure of the first switch 100, the driving circuit 12, the impedance unit 14 and the capacitor branches in different embodiments of the present invention.

Figure 5A:
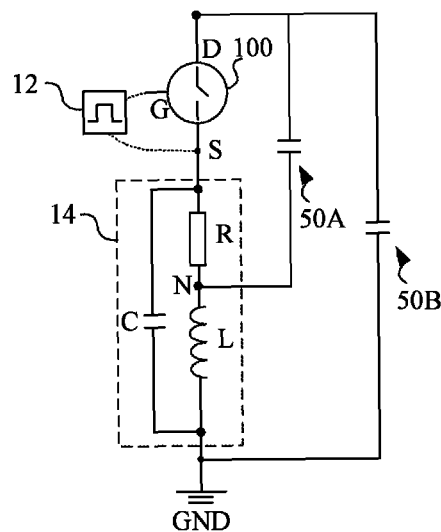
FIG. 5A to FIG. 5D are diagrams of the package structure of the first switch, the driving circuit, the impedance unit and the capacitor branches in different embodiments of the present invention.
Figure 5B:
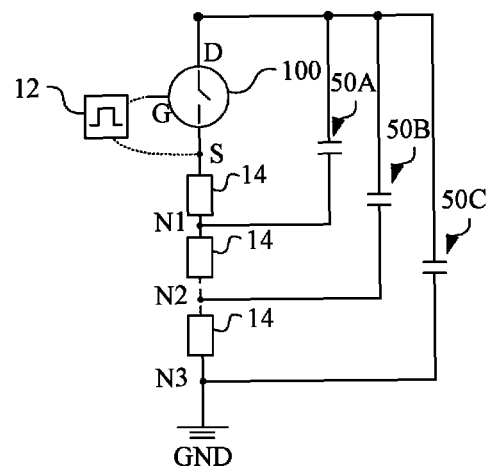
Figure 5C:
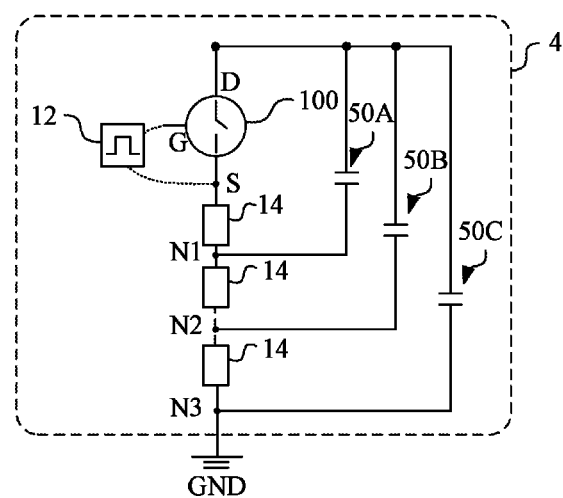

In an embodiment, the RFI suppression circuit 1 in FIG. 1 further includes the capacitor branches 50A and 50B illustrated in FIG. 5A. The capacitor branches 50A and 50B may include at least one high frequency capacitor.

In the present embodiment, the impedance unit 14 includes the structure in FIG. 3D, i.e. a network including the resistive component R and the inductive component L connected in series and the capacitive component C connected to the network in parallel are included therein. One end of the capacitor branch 50A is electrically coupled to an inner node N between the resistive component R and the inductive component L. The other end of the capacitor branch 50A is electrically coupled to a circuit node of the main power circuit 1, such as the first end D of the first switch 100. One end of the capacitor branch 50B is electrically coupled to a node between the impedance unit 14 and the reference ground end GND. The other end of the capacitor branch 50B is electrically coupled to the first end D of the first switch 100 too.

In other embodiments, the circuit node of the main power circuit 10 that the capacitor branches 50A and 50B are electrically coupled to can be other near ground potential power bus. Further, in different embodiments, the first switch 100 can be disposed in a package structure while the capacitor branches 50A and 50B can be selectively disposed in the same package structure or outside of the package structure. In another embodiment, when the number of the impedance unit 14 is more than two, a multiple of capacitor branches can be disposed corresponding to the impedance units 14, such as the capacitor branches 50A, 50B and 50C illustrated in FIG. 5B. One end of each of the capacitor branches 50A and 50B is electrically coupled to the nodes N1 and N2 between the impedance units 14 respectively. The other end thereof is electrically coupled to the first end D of the first switch 100. One end of the capacitor branch 50C is electrically coupled to a node N3 between the impedance units 14 and the reference ground end GND, the other end is electrically coupled to the first end D of the first switch 100.

Figure 5D:
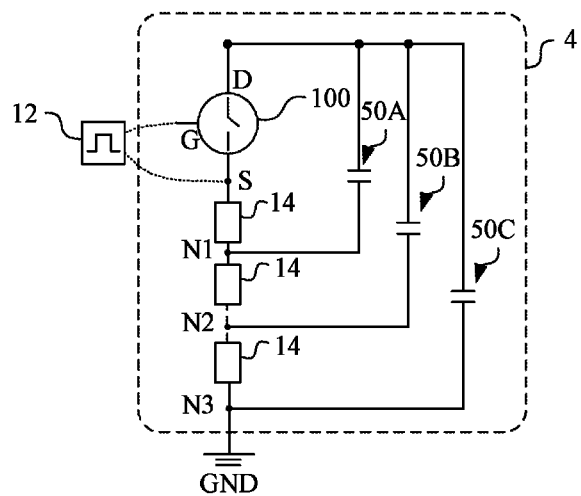

The multiple of capacitor branches 50A, 50B and 50C, the first switch 100 and the impedance units 14 can be disposed in the package structure 4 as illustrated in FIG. 4. The driving circuit 12 can be either disposed in the package structure 4 or outside of the package structure 4 as illustrated in FIG. 5D.

Figure 6A:
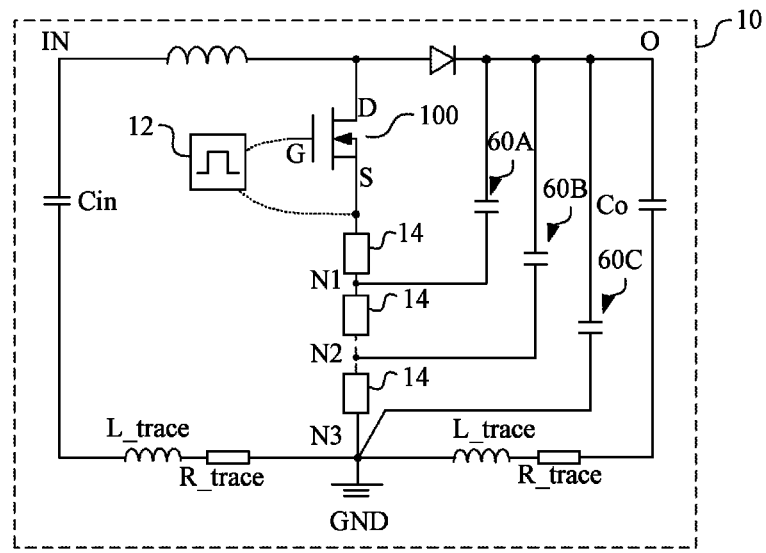
FIG. 6A to FIG. 6C are diagrams of a RFI suppression circuit in different embodiments of the present invention.
Figure 6B:
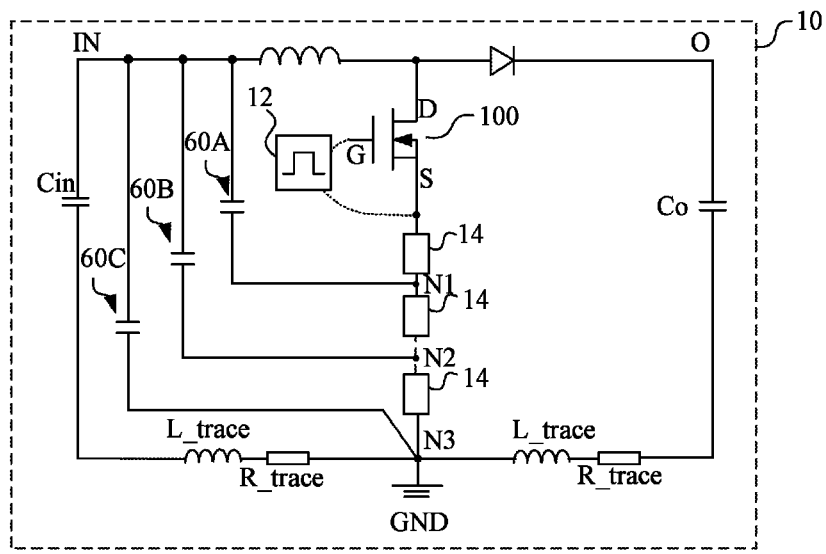
Figure 6C:
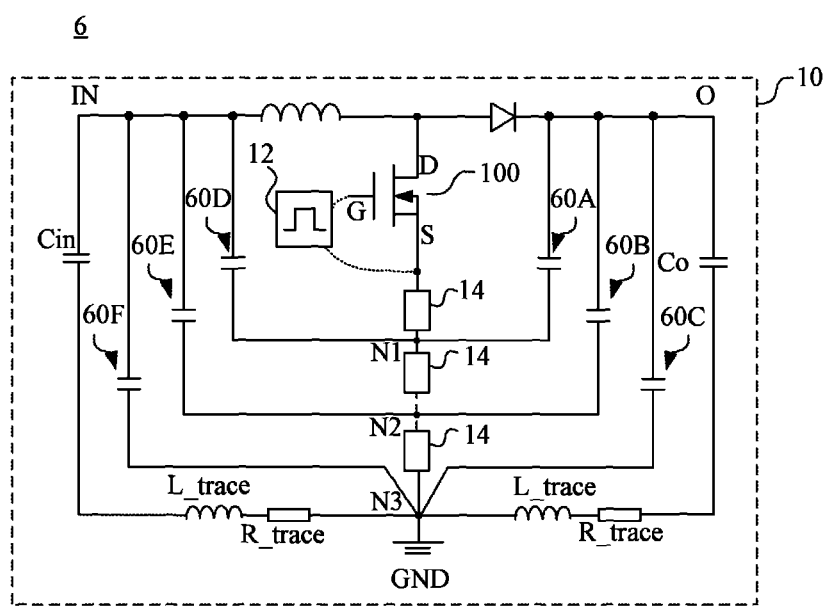

Reference is now made to FIG. 6A to FIG. 6C. FIG. 6A to FIG. 6C are diagrams of a RFI suppression circuit 6 in different embodiments of the present invention.

Most of the components in the RFI suppression circuit 6 are identical to those in the RFI suppression circuit 1 in FIG. 1B and include the main power circuit 10 in the configuration of the boost converter circuit, the driving circuit 12 and the reference ground end GND. As a result, the detail of the identical components is not described herein.

In the present embodiment, the RFI suppression circuit 6 includes a multiple of impedance units 14 and a multiple corresponding capacitor branches. Taking FIG. 6A as an example, the capacitor branches 60A, 60B and 60C are disposed correspondingly to the impedance units 14. One end of each the capacitor branches 60A and 60B is electrically coupled to the nodes N1 and N2 between the impedance units 14 respectively. The other end of each of the capacitor branches 60A and 60B is electrically coupled to the output end O of the boost converter circuit. One end of the capacitor branch 60C is electrically coupled to the node N3 between the impedance units 14 and the reference ground end GND. The other end is electrically coupled to the output end O of the boost converter circuit.

In another embodiment, taking FIG. 6B as an example, the capacitor branches 60A, 60B and 60C are disposed correspondingly to the impedance units 14. One end of each the capacitor branches 60A and 60B is electrically coupled to the nodes N1 and N2 between the impedance units 14 respectively. The other end of each of the capacitor branches 60A and 60B is electrically coupled to the input end IN of the boost converter circuit. One end of the capacitor branch 60C is electrically coupled to the node N3 between the impedance units 14 and the reference ground end GND. The other end is electrically coupled to the input end IN of the boost converter circuit. In another embodiment, the connection methods in FIG. 6A and FIG. 6B can be integrated to dispose the capacitor branch. Taking FIG. 6C as an example, the capacitor branches 60A, 60B and 60C are electrically coupled to the output end O and the impedance units 14 as the method in FIG. 6A, the capacitor branches 60D, 60E and 60F are electrically coupled to the input end IN and the impedance units 14 as the method in FIG. 6B.

Reference is now made to FIG. 7A to FIG. 7E. FIG. 7A to FIG. 7E are diagrams of a RFI suppression circuit 7 in different embodiments of the present invention. In the present embodiment, the main power circuit 10 in the RFI suppression circuit 7 is a half bridge circuit.

Figure 7A:
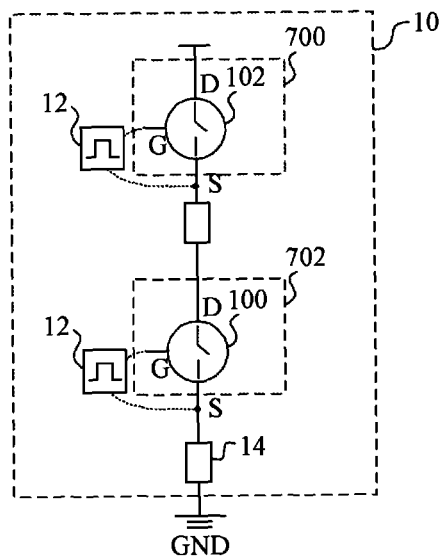
FIG. 7A to FIG. 7E are diagrams of a RFI suppression circuit in different embodiments of the present invention.

As illustrated in FIG. 7A, the main power circuit 10 includes an upper bridge 700 and a lower bridge 702 formed by the first switch 100 and a second switch 102 electrically coupled together. The type of the second switch also includes the MOSFET, IGBT and BJT. The impedance between the second terminal S of the first switch 100 in the lower bridge 702 and the reference ground end GND is lower than the impedance corresponding to the second switch 102. As a result, the impedance unit 14 is disposed to be electrically coupled to the first switch 100 in the lower bridge 702.

Figure 7B:
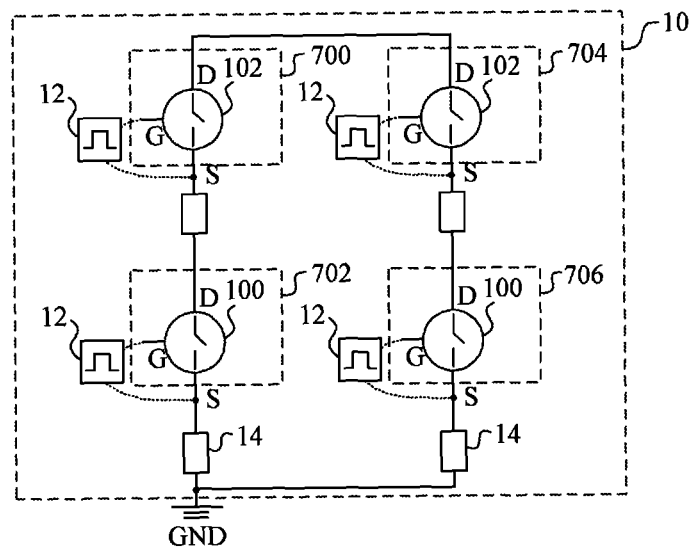

As illustrated in FIG. 7B, the main power circuit includes two pairs of second switches 102 and the first switches 100 electrically coupled together to form the upper bridges 700 and 704 and the lower bridges 702 and 706. The impedances of the second ends S of the first switches 100 in both the two lower bridges 702 and 706 and the reference ground end GND are the same, and such impedances are lower than those corresponding to the second switches 102 of the upper bridges 700 and 704. As a result, the impedance units 14 are disposed to be electrically coupled to the first switches 100 in the lower bridges 702 and 706.

Figure 7C:
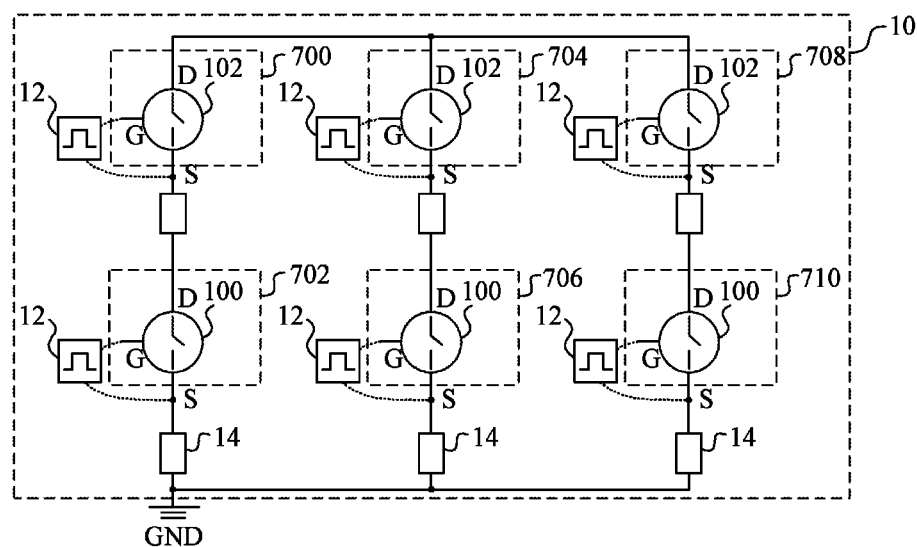

As illustrated in FIG. 7C, the main power circuit includes three pairs of second switches 102 and the first switches 100 electrically coupled together to form the upper bridges 700, 704 and 708 and the lower bridges 702, 706 and 710. The impedances of the second ends S of the first switches 100 in the three lower bridges 702, 706 and 710 and the reference ground end GND are the same, and such impedances are lower than those corresponding to the second switches 102 of the upper bridges 700, 704 and 708. As a result, the impedance units 14 are disposed to be electrically coupled to the first switches 100 in the lower bridges 702, 706 and 710.

Figure 7D:
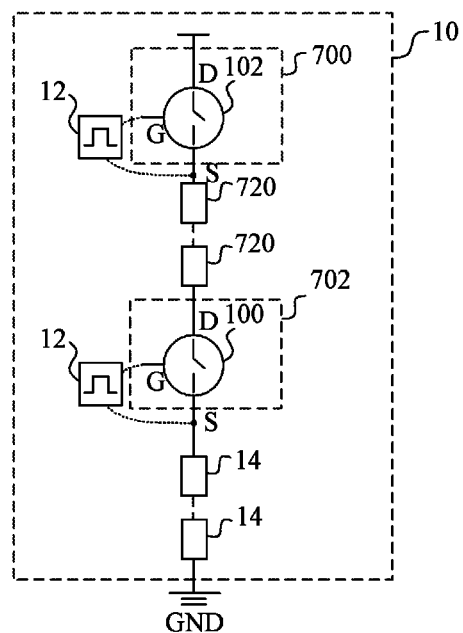
Figure 7E:
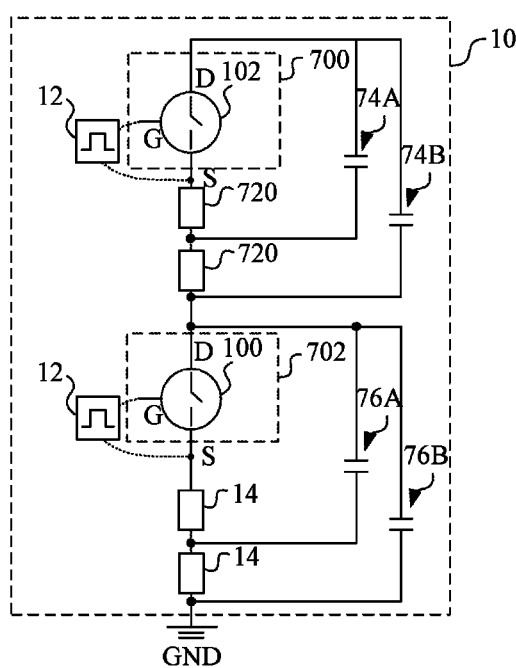

For the other bridge topologies, the above definition can be applied. In order to match different operation statuses and the conversion loops of the circuits, in part of the embodiments, as illustrated in FIG. 7D, additional impedance units 720 can be added between the second switch 102 and the first switch 100 of the upper and lower bridges 700 and 702 to accomplish a better filtering and attenuation result. In another embodiment, as illustrated in FIG. 7E, the capacitor branches 74A, 74B, 76A and 76B corresponding to the upper and the lower bridges can be combined with the topology in FIG. 7D to realize a multiple stages of filtering network. The combination and the package structure of the second switch, the impedance unit and the capacitor branch can be referred to the description related to the first switch. The difference of the second switch and the first switch is that the impedance of the second end of the second switch to the reference ground end is not to smallest impedance.

Figure 8A:
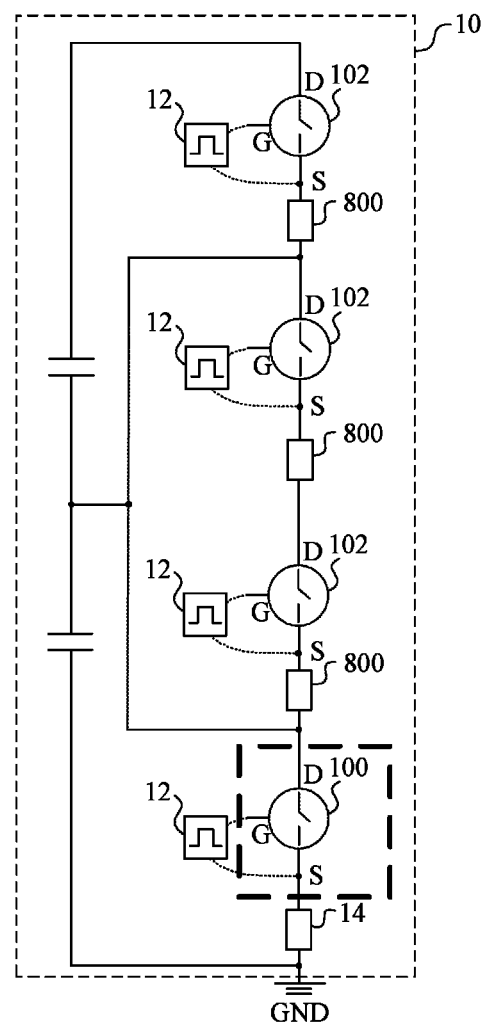
FIG. 8A to FIG. 8B are diagrams of a RFI suppression circuit in different embodiments of the present invention.
Figure 8B:
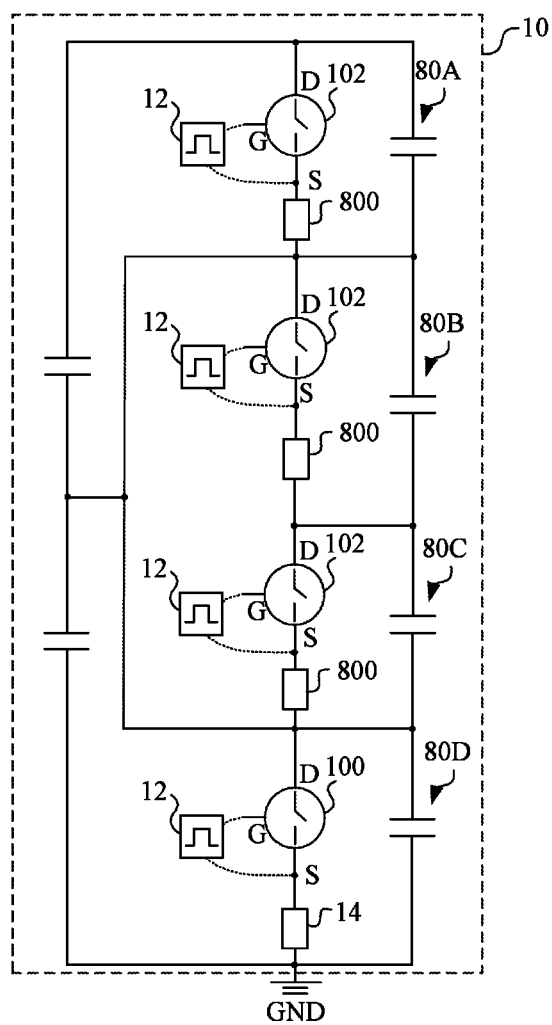

Reference is now made to FIG. 8A to FIG. 8B. FIG. 8A to FIG. 8B are diagrams of a RFI suppression circuit 8 in different embodiments of the present invention. In the present embodiment, the main power circuit 10 in the RFI suppression circuit 8 is a D-type three level bridge circuit.

As illustrated in FIG. 8A, the first switch 100 (surrounded by think dashed frame) that is closest to the reference ground end GND has the minimal impedance as compared to the other second switches 102. As a result, the impedance unit 14 is disposed to be electrically coupled to this closest first switch 100. In order to match different operation statuses and the conversion loops of the circuits, additional impedance units 800 can be added to be corresponding to the second switch 102 to accomplish a better filtering and attenuation result. In another embodiment, as illustrated in FIG. 8B, the capacitor branches 80A, 80B, 80C and 80D can be combined with the topology in FIG. 8A to realize a multiple stages of filtering network.

Figure 9A:
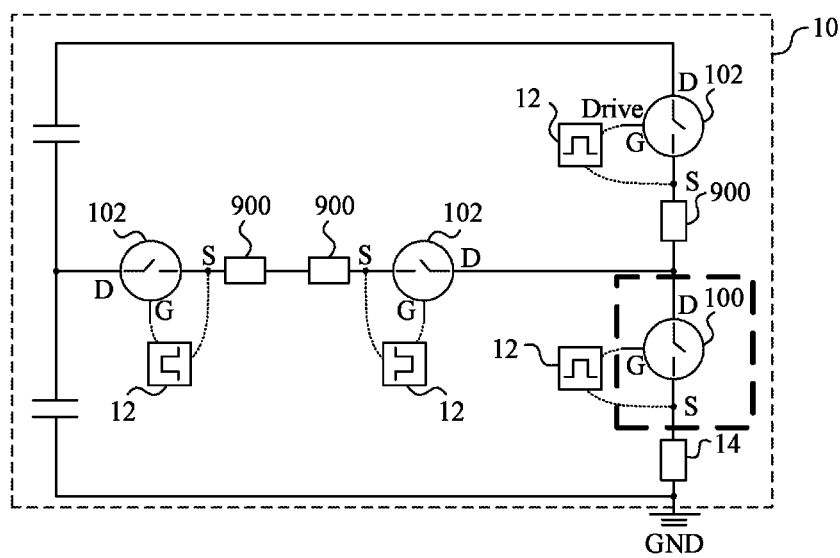
FIG. 9A to FIG. 9B are diagrams of a RFI suppression circuit in different embodiments of the present invention.
Figure 9B:
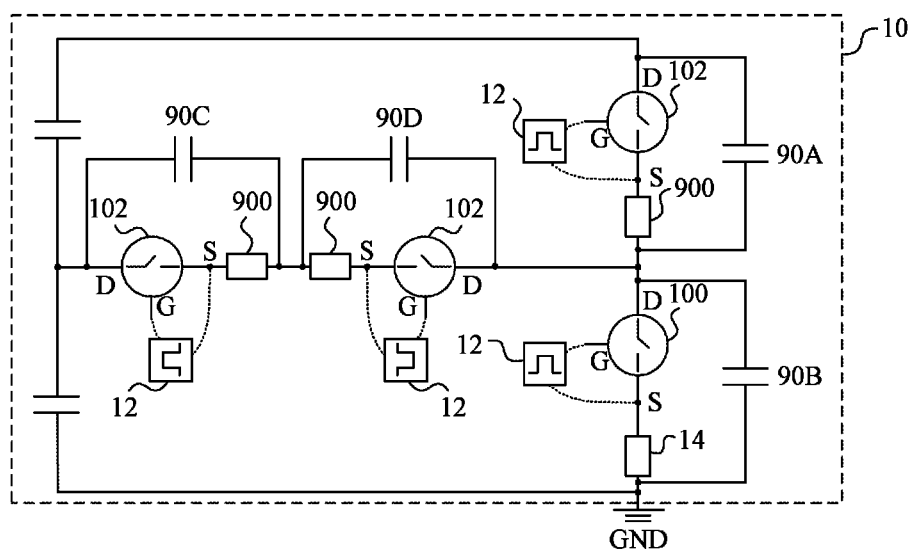

Reference is now made to FIG. 9A to FIG. 9B. FIG. 9A to FIG. 9B are diagrams of a RFI suppression circuit 9 in different embodiments of the present invention. In the present embodiment, the main power circuit 10 in the RFI suppression circuit 9 is a T-type three level bridge circuit.

As illustrated in FIG. 9A, the first switch 100 (surrounded by think dashed frame) that is closest to the reference ground end GND has the minimal impedance as compared to the other second switches 102. As a result, the impedance unit 14 is disposed to be electrically coupled to this closest first switch 100. In order to match different operation statuses and the conversion loops of the circuits, additional impedance units 900 can be added to be corresponding to the second switch 102 to accomplish a better filtering and attenuation result. In another embodiment, as illustrated in FIG. 9B, the capacitor branches 90A, 90B, 90C and 90D can be combined with the topology in FIG. 9A to realize a multiple stages of filtering network.

Figure 10A:
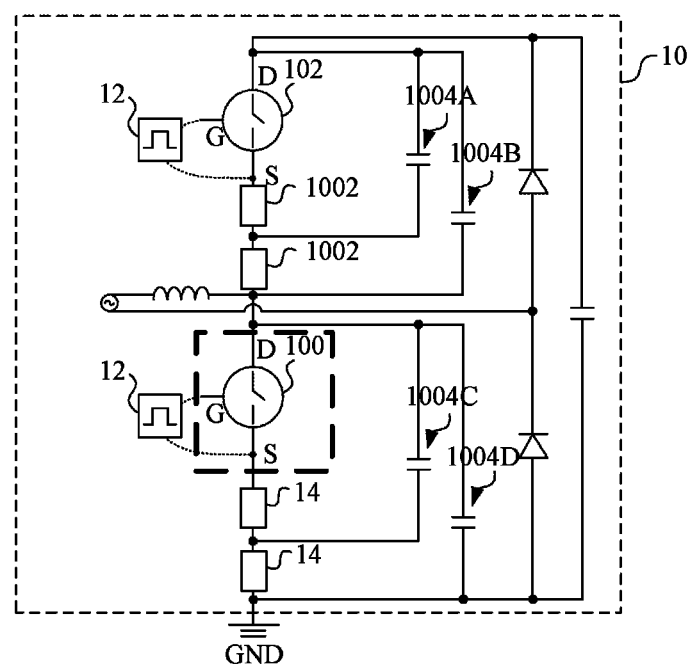
FIG. 10A to FIG. 10B are diagrams of a RFI suppression circuit in different embodiments of the present invention.
Figure 10B:
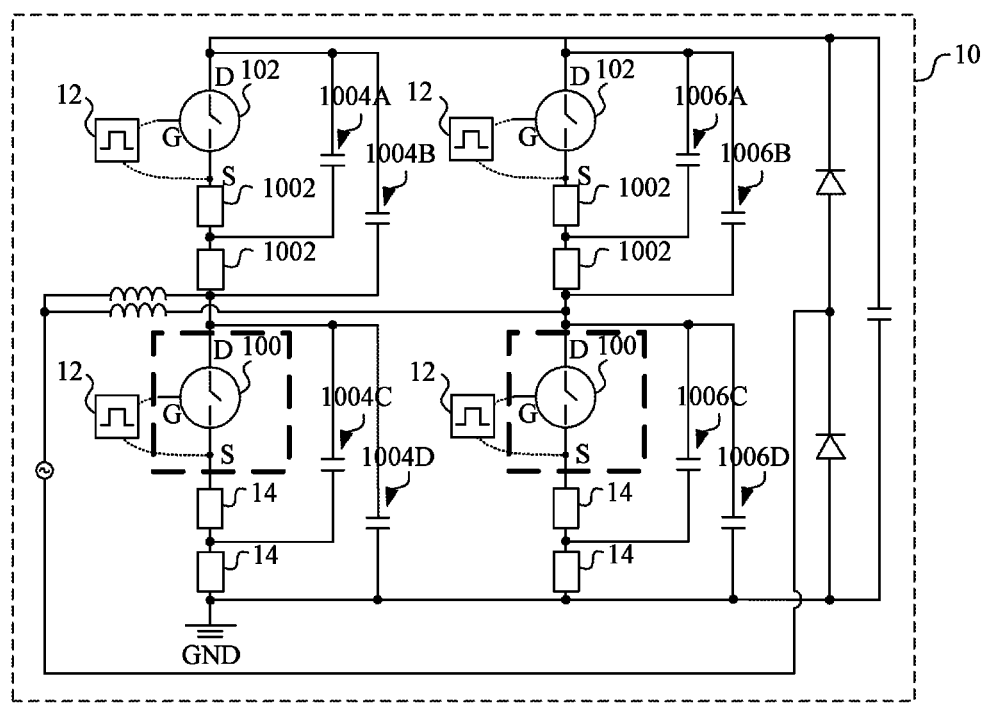

Reference is now made to FIG. 10A to FIG. 10B. FIG. 10A to FIG. 10B are diagrams of a RFI suppression circuit 1000 in different embodiments of the present invention. In the present embodiment, the main power circuit 10 in the RFI suppression circuit 1000 is a totem pole power factor correction circuit.

The single type totem pole power factor correction circuit is illustrated in FIG. 10A. The first switch 100 (surrounded by think dashed frame) that is closest to the reference ground end GND has the minimal impedance as compared to the other second switches 102. As a result, the impedance unit 14 is disposed to be electrically coupled to this closest first switch 100. In order to match different operation statuses and the conversion loops of the circuits, additional impedance units 1002 can be added to be corresponding to the second switch 102 to accomplish a better filtering and attenuation result. The capacitor branches 1004A, 1004B, 1004C and 1004D can be combined to realize a multiple stages of filtering network.

The interleaving type totem pole power factor correction circuit is illustrated in FIG. 10B. The two first switches 100 (surrounded by think dashed frame) that are closest to the reference ground end GND has the minimal impedance as compared to the other second switches 102. As a result, the impedance units 14 are correspondingly disposed to be electrically coupled to those closest first switches 100. In order to match different operation statuses and the conversion loops of the circuits, additional impedance units 1002 can be added to be corresponding to the second switch 102 to accomplish a better filtering and attenuation result. The capacitor branches 1004A-1004D and 1006A-1006D can be combined to realize a multiple stages of filtering network.

Figures 11, 12:
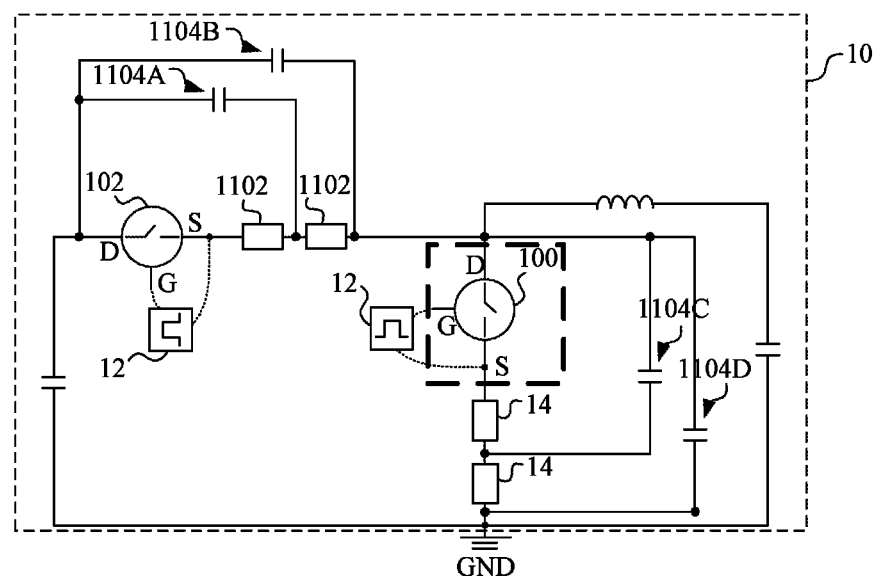
FIG. 11 is a diagram of a RFI suppression circuit in an embodiment of the present invention.
FIG. 12 is a circuit diagram of a main power circuit of a primary/secondary side isolated type in an embodiment of the present invention.

Reference is now made to FIG. 11. FIG. 11 is a diagram of a RFI suppression circuit 1100 in an embodiment of the present invention. In the present embodiment, the main power circuit 10 in the RFI suppression circuit 1100 is a synchronous buck converter circuit.

As illustrated in FIG. 11, the first switch 100 (surrounded by think dashed frame) that is closest to the reference ground end GND has the minimal impedance as compared to the other second switches 102. As a result, the impedance unit 14 is disposed to be electrically coupled to this closest first switch 100. In order to match different operation statuses and the conversion loops of the circuits, additional impedance units 1102 can be added to be corresponding to the second switch 102 to accomplish a better filtering and attenuation result. The capacitor branches 1104A-1104D can be combined to realize a multiple stages of filtering network.

Reference is now made to FIG. 12. FIG. 12 is a circuit diagram of a main power circuit 10 of a primary/secondary side isolated type in an embodiment of the present invention.

For a power converter of the primary/secondary side isolated type such as a fly-back converter, in the primary side differential mode loop 1200 having the primary side winding, the switches and the high frequency capacitors, a high frequency voltage drop Vac is generated between the nodes A and C due to the high frequency current passing through the parasitic impedance relative to the reference ground of the primary side. Similarly, in the secondary side differential mode loop 1202, a high frequency voltage drop Vbd is generated between the nodes B and D due to the presence of the parasitic impedance relative to the reference ground of the secondary ground. Usually, a capacitor Cy0 or other kind impedance is presented between the reference grounds of the primary side and the secondary side to decrease the common mode electromagnetic interference. The common mode displacing current generated due to the sudden voltage changes from the switches between the primary side and the secondary side flows through the common mode impedances Cps and Cy0. A high frequency voltage drop Vab is generated between nodes A and B on the path corresponding to the impedance Cy0.

As a result, the high frequency voltage drop equivalent to Vac+Vab+Vbd is presented between the primary input wire 1204 and the secondary output wire 1206 and excites the primary input wire 1204 and the secondary output wire 1206 to form a delivering antenna to generate RFI.

Figure 13:
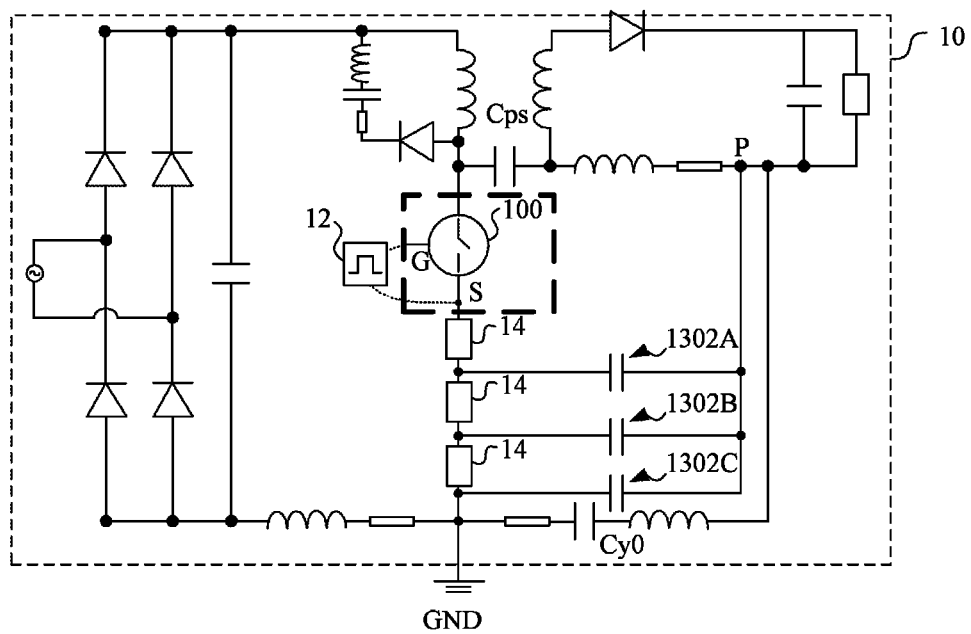
FIG. 13 is a diagram of a RFI suppression circuit in an embodiment of the present invention.

Reference is now made to FIG. 13. FIG. 13 is a diagram of a RFI suppression circuit 1300 in an embodiment of the present invention. In the present embodiment, the main power circuit 10 in the RFI suppression circuit 1300 is a fly-back converter.

As illustrated in FIG. 13, the first switch 100 (surrounded by think dashed frame) in the primary side that is closest to the reference ground end GND has the minimal impedance as compared to the other second switches 102. As a result, the impedance unit 14 is disposed to be electrically coupled to this closest first switch 100. In order to match different operation statuses and the conversion loops of the circuits, additional impedance unit 14 can be added to be corresponding to the second switch 102 to accomplish a better filtering and attenuation result. The capacitor branches 1302A, 1302B and 1302C can be combined to realize a multiple stages of filtering network. One end of these capacitor branches is coupled to a node of one end of the impedance unit 14, and the other end of these capacitor branches can be coupled to either the constant voltage node of the primary side or the constant voltage node of the secondary side. The constant voltage node refers to a circuit node that has no high frequency voltage deviation and always has a constant voltage relative to a stable reference ground, such as the positive and negative bus of the primary input side or the secondary output side. In the present embodiment, the capacitor branches are coupled to the constant voltage node P of the secondary side to decrease the high frequency voltage drop between the primary and the secondary sides to decrease the RFI of the converter.

Figure 14:
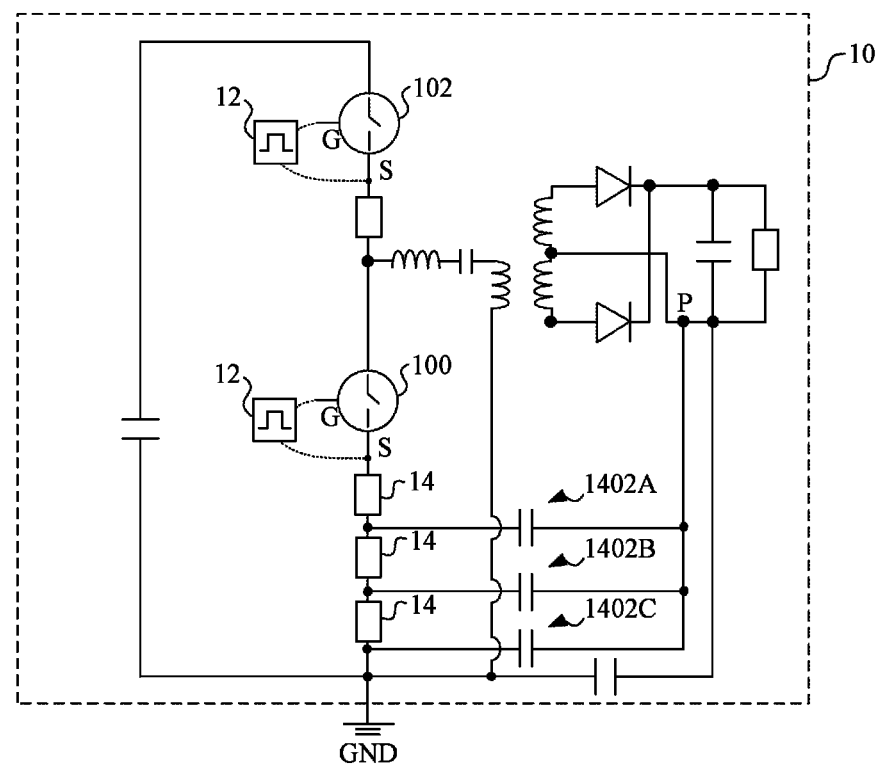
FIG. 14 is a diagram of a RFI suppression circuit in an embodiment of the present invention.

Reference is now made to FIG. 14. FIG. 14 is a diagram of a RFI suppression circuit 1400 in an embodiment of the present invention. In the present embodiment, the main power circuit 10 in the RFI suppression circuit 1400 is a LLC converter.

For the half bridge or the full bridge resonance converter circuit, as illustrated in FIG. 14, the first switch 100 (surrounded by think dashed frame) in the primary side that is closest to the reference ground end GND has the minimal impedance as compared to the other second switches 102. As a result, the impedance unit 14 is disposed to be electrically coupled to this closest first switch 100. In order to match different operation statuses and the conversion loops of the circuits, additional impedance unit 14 can be added to be corresponding to the second switch 102 to accomplish a better filtering and attenuation result. The capacitor branches 1402A, 1402B and 1402C can be combined to realize a multiple stages of filtering network. One end of these capacitor branches is coupled to a node of one end of the impedance unit 14, and the other end of these capacitor branches can be coupled to either the constant voltage node of the primary side or the constant voltage node of the secondary side. The constant voltage node refers to a circuit node that has no high frequency voltage deviation and always has a constant voltage relative to a stable reference ground, such as the positive and negative bus of the primary input side or the secondary output side. In the present embodiment, the capacitor branches are coupled the constant voltage node P of the secondary side is coupled to decrease the high frequency voltage drop between the primary and the secondary sides to decrease the RFI of the converter.

Figure 15A:
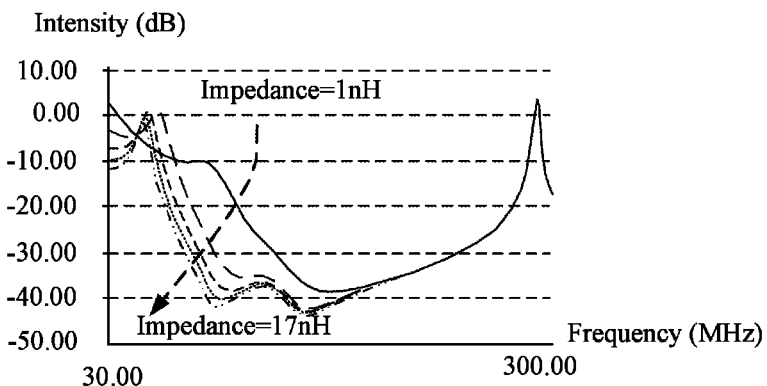
FIG. 15A and FIG. 15B are diagrams of the frequency response of the RFI in an embodiment of the present invention.
Figure 15B:
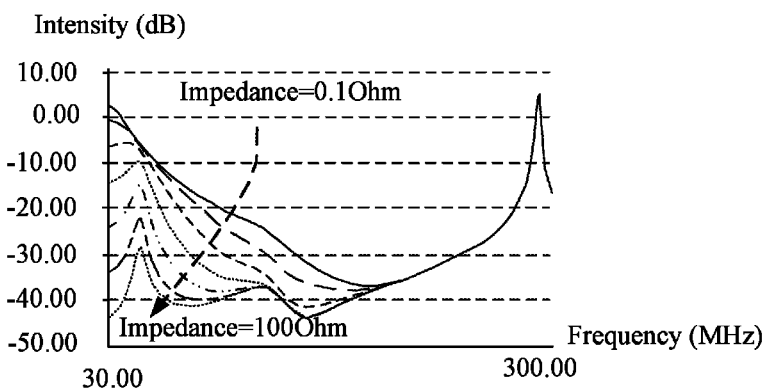

Reference is now made to FIG. 15A and FIG. 15B. FIG. 15A and FIG. 15B are diagrams of the frequency response of the RFI in an embodiment of the present invention. The x-axis is the frequency of the RFI signal in the unit of mega Hertz. The y-axis is the intensity of the RFI signal in the unit of dB. The following description uses the boost converter circuit as an exemplary main power circuit to demonstrate the efficiency of the RFI suppression efficiency.

As illustrated in FIG. 2, the dashed line illustrates the condition of having no impedance unit such that only the parasitic impedance of 0.03 nH is presented in the path 16. The thinner line illustrates the condition of adding the impedance unit 14 to have the impedance value of 0.3 nH. The thicker line illustrates the condition of adding the impedance unit 14 to have the impedance value of 3 nH. Obviously, when the impedance value of the added impedance unit 14 is larger, the intensity of the RFI signal decreases more. Alternatively stated, the impedance unit 14 having the larger impedance value has a greater suppression effect on the RFI condition. Based on the size of the current circuit board wiring design, the parasitic inductance of the wires is about 5 nH and the mutual inductance between each of the loop wires is not neglectable. Through the scanning of the frequency domain parameters, it can be observed that the changes of the impedance unit 14 result in the corresponding changes of the high frequency voltage drop. As illustrated in FIG. 15A and FIG. 15B, when the impedance value of the added impedance unit 14 (taking the inductive or the resistive impedance unit as an example) gradually increases and when the high frequency decoupling capacitors are incorporated, a multiple filtering stages around the source are formed such that there is 10 dB to 30 dB of attenuation during the radio frequency band in the curve of the frequency response.

In FIG. 15A, the curves from top to down as indicated by the arrow with the dashed line correspond to the frequency responses when the added inductor has the impedance values of 1 nH, 5 nH, 9 nH, 13 nH and 17 nH respectively, wherein the combined capacitor is 10 nF. If the curve corresponding to the added inductor having the impedance of 1 nH is used as an initial object to be compared, it is obvious that the curve of the frequency response gradually decreases along with the increment of the inductance of the added inductor. A larger amount of attenuation ranging from 5 dB to 30 dB is obtained within the frequency band from 40 MHz to 100 MHz.

In FIG. 15B, the curves from top to down as indicated by the arrow with the dashed line correspond to the frequency responses when the added resistance has the impedance values of 0.1 Ohm to 100 Ohm (the impedance values are 0.1 Ohm, 0.3 Ohm, 1 Ohm, 3 Ohm, 10 Ohm, 30 Ohm and 100 Ohm respectively), wherein the combined capacitor is 10 nF. If the curve corresponding to the added resistor having the impedance of 0.1 Ohm is used as an initial object to be compared, it is obvious that the curve of the frequency response gradually decreases along with the increment of the resistance of the added resistor. A larger amount of attenuation ranging from 5 dB to 40 dB is obtained within the frequency band from 30 MHz to 100 MHz.

It is obvious that as compared to the initial status, an attenuation is generated within a certain frequency band due to the added impedance unit 14. As a result, the frequency response characteristic can be adjusted by adjusting a combination of the parameters of the impedance unit 14 and the high frequency capacitor to bring the attenuation specifically at other frequency bands of the frequency response curve.

Figure 16:
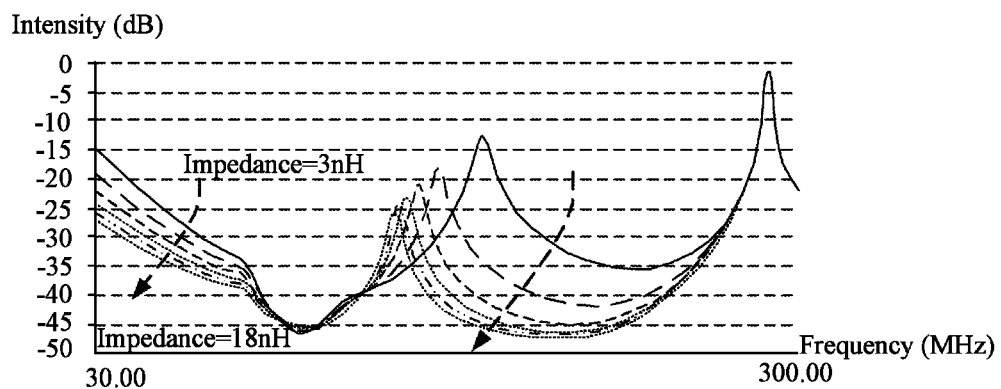
FIG. 16 is a diagram of the frequency response of the RFI in an embodiment of the present invention.
Figure 17:
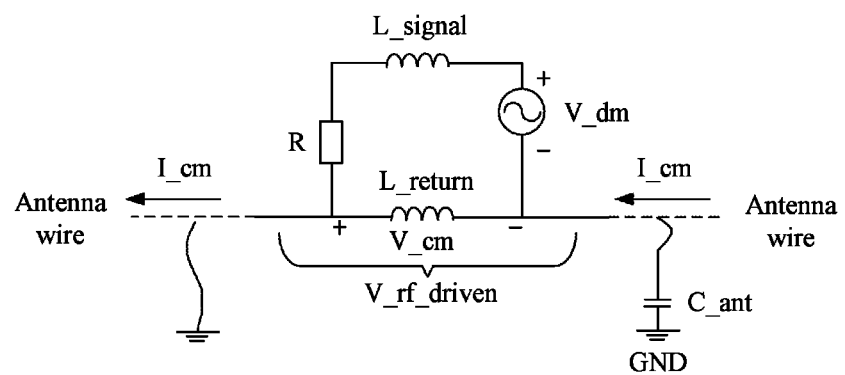
FIG. 17 is a diagram of an equivalent delivering model of the differential mode loop.

Reference is now made to FIG. 16. FIG. 16 is a diagram of the frequency response of the RFI in an embodiment of the present invention. The x-axis is the frequency of the RFI signal in the unit of mega Hertz. The y-axis is the intensity of the RFI signal in the unit of dB.

If a package technology with an even smaller size is used to shrink the connection length of the conductive objects between the sourced and the non-sourced components, the parasitic inductance of the wire is smaller than 1 nH and the coupling coefficients between the loops having a smaller size become 1/10 of the original value or an even smaller amount. The added impedance unit 14 in combination with the high frequency capacitor branch mentioned above result in an even greater attenuation of the high frequency excitation between the equivalent antennas of the input and output wires. In FIG. 16, the curves from top to down as indicated by the arrow with the dashed line correspond to the frequency responses when the added inductor has the impedances of 3 nH, 6 nH, 9 nH, 12 nH, 15 nH and 18 nH respectively, wherein the combined capacitor is 1 nF. If the curve corresponding to the added inductor having the impedance of 3 nH is used as an initial object to be compared, it is obvious a larger amount of attenuation ranging from 5 dB to 15 dB is obtained within the frequency band from 30 MHz to 47 MHz. A larger amount of attenuation ranging from 5 dB to 30 dB is obtained within the frequency band from 100 MHz to 200 MHz. As compared to the examples in FIG. 15A and FIG. 15B, the result in FIG. 16 reveals that when the circuit uses advanced package technology to make the parasitic parameters even smaller, a better high frequency attenuation result can be obtained by using a combination of the impedance unit 14 and capacitor having an even smaller values.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A radio frequency interference (RFI) suppression circuit comprising:
   a reference ground end;
   a main power circuit comprising at least one first switch that comprises a control end, a first end and a second end, wherein a minimal impedance is presented between the second end and the reference ground end;
   a driving circuit electrically coupled to the control end and the second end; and
   at least one first impedance unit disposed between the second end and the reference ground end to increase an impedance value in a high frequency differential mode loop to reduce a high frequency voltage drop in the high frequency differential return path;

wherein the first switch receives a driving signal from the driving circuit at the control end to be turned on or turned off between the first and the second ends accordingly to make the main power circuit converts a first power signal to a second power signal.

2. The RFI suppression circuit of claim 1, further comprising at least one second impedance units, and the main power circuit comprises a second switch having a control end, a first end and a second end, wherein the second impedance units is further electrically coupled to the first end and/or the second end of the second switch to increase the impedance value in the high frequency differential mode loop to reduce the high frequency voltage drop in the high frequency differential return path.

3. The RFI suppression circuit of claim 1, wherein the first switch is an insulated gate bipolar transistor (IGBT), a bipolar junction transistor (BJT) or a semiconductor field-effect transistor (MOSFET), wherein the control end, the first end and the second end are respectively a base, a collector and an emitter of the IGBT or the BJT or are respectively a gate, a drain and a source of the MOSFET.

4. The RFI suppression circuit of claim 1, wherein the first impedance unit has an impedance value not lower than 0.6 Ohm during a radiation frequency band of 30 mega hertz (MHz) to 1000 MHz.

5. The RFI suppression circuit of claim 1, wherein the first impedance unit comprises a plurality of impedance components that comprise a resistive component, an inductive component, a capacitive component or a combination of the above.

6. The RFI suppression circuit of claim 1, wherein the first switch is disposed in a package structure and the first impedance unit is disposed inside or outside of the package structure.

7. The RFI suppression circuit of claim 1, further comprising a plurality of the first switches connected in parallel or in series within a package structure.

8. The RFI suppression circuit of claim 1, wherein the first switch is disposed in a package structure and the driving circuit is disposed inside or outside of the package structure.

9. The RFI suppression circuit of claim 1 further comprising at least one capacitor branch each comprising a capacitor branch first end and a capacitor branch second end, wherein the capacitor branch first end is electrically coupled to one end of the first impedance unit or an inner node of the first impedance unit and the capacitor branch second end is electrically coupled to a circuit node of the main power circuit.

10. The RFI suppression circuit of claim 2 further comprising at least one capacitor branch each comprising a capacitor branch first end and a capacitor branch second end, wherein the capacitor branch first end is electrically coupled to one end of the second impedance unit or an inner node of the second impedance unit and the capacitor branch second end is electrically coupled to a circuit node of the main power circuit.

11. The RFI suppression circuit of claim 9, wherein the capacitor path comprises at least one high frequency capacitor.

12. The RFI suppression circuit of claim 9, wherein the first switch is disposed in a package structure and the capacitor branch is disposed inside or outside of the package structure.

13. The RFI suppression circuit of claim 9, wherein the circuit node of the main power circuit is a near ground power bus, or the first end of the first switch corresponding to the first impedance unit.

14. The RFI suppression circuit of claim 1, wherein the main power circuit is a non-isolated converter circuit, and the non-isolated converter circuit is a buck converter, a boost converter, a half bridge circuit, a full bridge circuit, a D-type three level bridge circuit, a T-type three level bridge circuit, a totem pole power factor correction circuit or a synchronous buck converter circuit.

15. The RFI suppression circuit of claim 1, wherein the main power circuit is an isolated converter circuit, and the isolated converter circuit is a fly-back converter or a LLC converter.

16. The RFI suppression circuit of claim 15, wherein the first switch is disposed at a primary side winding of the isolated converter circuit.

17. The RFI suppression circuit of claim 16, further comprising at least one capacitor path each comprising a capacitor branch first end and a capacitor branch second end, wherein the capacitor branch first end is electrically coupled to one end of the first impedance unit or an inner node of the first impedance unit and the capacitor branch second end is electrically coupled to a constant voltage node of the primary side winding or a secondary side winding of the isolated converter circuit.

18. The RFI suppression circuit of claim 17, wherein the constant voltage node is a positive and negative bus of the primary side winding or the secondary side winding.

* * * * *